US012327926B2

(12) United States Patent
Tseng et al.

(10) Patent No.: US 12,327,926 B2
(45) Date of Patent: Jun. 10, 2025

(54) WI-FI ANTENNAS USING DIELECTRIC INSERTS WITH FEEDLINE TUNNELS FOR REDUCED ELECTROMAGNETIC INTERFERENCE (EMI)

(71) Applicant: NETGEAR, Inc., San Jose, CA (US)

(72) Inventors: Ting Chih Tseng, Taipei (TW); Che Yen Huang, Taipei (TW)

(73) Assignee: NETGEAR, INC., San Jose, CA (US)

( * ) Notice: Subject to any disclaimer, the term of this patent is extended or adjusted under 35 U.S.C. 154(b) by 272 days.

(21) Appl. No.: 18/153,925

(22) Filed: Jan. 12, 2023

(65) Prior Publication Data

US 2024/0243474 A1 Jul. 18, 2024

(51) Int. Cl.
*H01Q 5/10* (2015.01)
*H01Q 1/22* (2006.01)
*H01Q 1/52* (2006.01)
*H01Q 5/307* (2015.01)

(52) U.S. Cl.
CPC ............ *H01Q 5/10* (2015.01); *H01Q 1/2291* (2013.01); *H01Q 1/526* (2013.01); *H01Q 5/307* (2015.01)

(58) Field of Classification Search
CPC ........ H01Q 5/10; H01Q 1/2291; H01Q 1/526; H01Q 5/307
See application file for complete search history.

(56) References Cited

U.S. PATENT DOCUMENTS 6,421,024 B1 * 7/2002 Stolle .................... H01Q 9/285 343/792
10,236,585 B2 * 3/2019 Nysen ................... H01Q 5/371

* cited by examiner

*Primary Examiner* — Dieu Hien T Duong
(74) *Attorney, Agent, or Firm* — Perkins Coie LLP

(57) ABSTRACT

An antenna for reducing Electromagnetic Interference (EMI) using a dielectric insert with a feedline tunnel is disclosed. The antenna comprises a first metallic portion, a second metallic portion, a plastic insert, and a cable. The first and second metallic portions held together by the plastic insert, which bridges a gap separating both portions. Both portions include trough-shaped shells and conduits, the conduits configured to be disposed inside the shells and connected to the shells. The cable is configured to pass through a tunnel belonging to the plastic insert and configured to communicate signals to the antenna, the cable comprising an electrically insulative shielding configured to be grounded to one of the metallic portions, and an electrically conductive core encapsulated by the shielding and configured to be connected to the other metallic portion.

13 Claims, 9 Drawing Sheets

WI-FI ANTENNAS USING DIELECTRIC INSERTS WITH FEEDLINE TUNNELS FOR REDUCED ELECTROMAGNETIC INTERFERENCE (EMI)

TECHNICAL FIELD

The present disclosure is generally related to Wi-Fi antennas using dielectric inserts with feedline tunnels for reduced electromagnetic interference (EMI).

BACKGROUND

Internet speeds and Wi-Fi have improved recently. However, wireless networks deployed over a geographical area can slow down when client devices are too far from the router. The further a client device is from the router, the more unreliable the connection and its throughput. Moreover, a lack of bandwidth can affect wireless networks deployed over a geographical area, for example, when multiple client devices are in use, the network is spread thin, and the access speed slows down.

DETAILED DESCRIPTION

Being able to connect to the internet has become a necessity in modern society. Many opportunities, including professional and educational, rely heavily—or exclusively—on having internet access. Wi-Fi technology is an important part of meeting this need, as it allows multiple devices to access the same connection across an area in which the devices may be separated by significant distances or obstacles. The design of the antenna that is transferring the Wi-Fi signal to these devices, therefore, becomes a significant part of meeting this need. However, the cable that provides the signal to the antenna to begin with can alter or otherwise negatively affect the way in which the wireless signal radiates from the antenna. This Electromagnetic Interference (EMI) is compounded by current antenna designs.

The embodiments disclosed herein describe Wi-Fi antennas that use dielectric inserts with feedline tunnels for reducing EMI. The advantages and benefits of the methods, systems, and apparatuses disclosed herein include broadening the range of a wireless network throughout an area. The antennas disclosed strengthen the wireless signal of the router. The disclosed systems address the problem of EMI introduced by longer coaxial cables, or feedlines, when connected to a Wi-Fi antenna. The disclosed antennas decrease the noise in wireless radiation patterns, regardless of the operating frequency of the antenna by providing a dipole structure.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610a") described as a single instance. Further, plural instances (e.g., "610") refer collectively to a set of components, operations, or structures (e.g., "610a") described as a single instance. The description of a single component (e.g., "610a") applies equally to a like-numbered component (e.g., "610b") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

Figure 1:
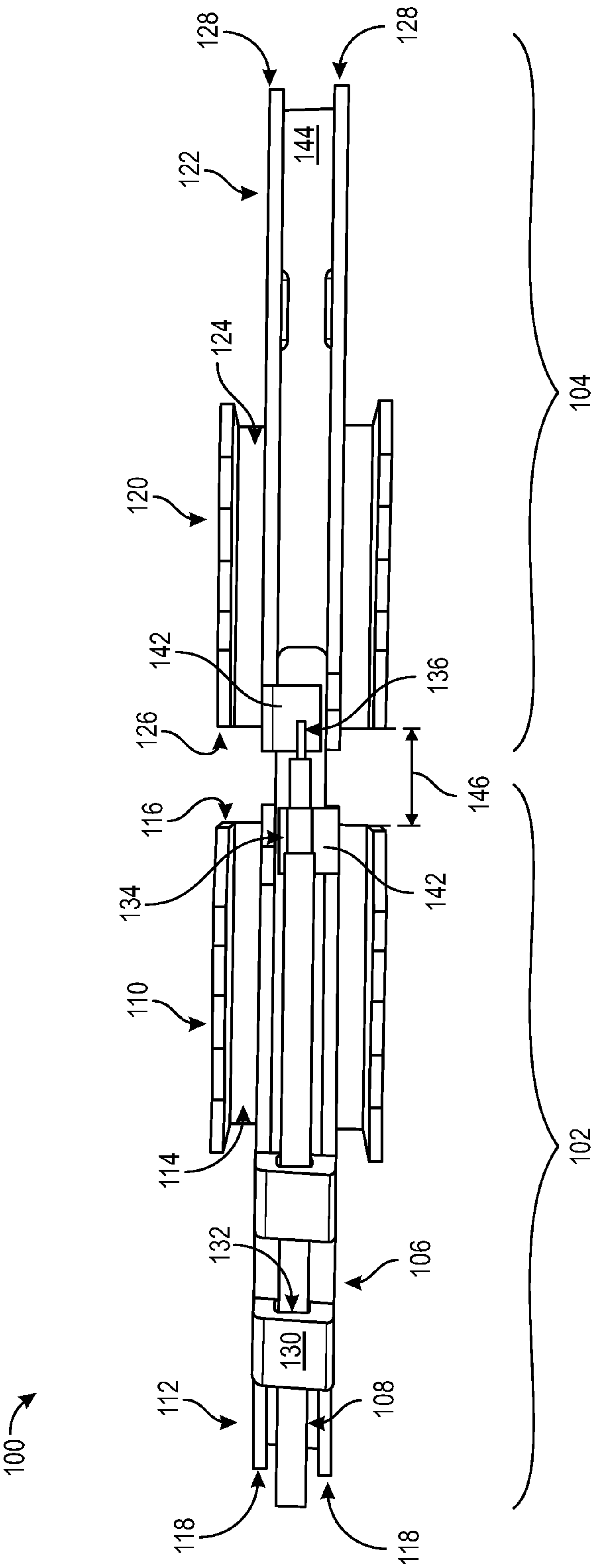
FIG. 1 is a drawing illustrating an example antenna for reducing electromagnetic interference using dielectric inserts with feedline tunnels, in accordance with one or more embodiments.

FIG. 1 is a drawing illustrating an example antenna 100 for reducing electromagnetic interference using dielectric inserts with feedline tunnels, in accordance with one or more embodiments. The antenna 100 includes a first metallic portion 102, a second metallic portion 104, a plastic insert 106, and a cable 108. The first metallic portion 102 and the second metallic portion 104 includes one or a combination of the following materials: copper, annealed copper, stainless steel, gold, silver, aluminum, calcium, tungsten, zinc, nickel, or iron, or some alloy or mixture of the foregoing metals, or barium carbonate, silicon dioxide, yttrium oxide, or other advanced ceramic materials, or carbon nanotube hybrids. The plastic insert 106 includes one or a combination of the following materials: Acrylonitrile butadiene styrene (ABS), polycarbonate, acrylic-polyvinyl chloride thermoplastic, recycled thermoplastics, Thermoplastic Polyolefin, amorphous blends of polyphenylene ether resin and polystyrene, amorphous thermoplastic polyetherimide, Polytetrafluoroethylene, other amorphous thermoplastics, high-performance polyaryletherketones, fluoropolymers, or electromagnetically transparent plastics with dielectric properties. The cable 108 includes a coaxial cable, wherein the coaxial cable has a length of 5 mm, 50 mm, 100 mm, 150 mm, 200 mm, 250 mm, or 500 mm, or some intermediate length encompassed by the range of foregoing lengths.

The first metallic portion 102 possesses a first trough-shaped shell 110 and a first trough-shaped conduit 112. The first trough-shaped shell 110 has a width and a length, the width measuring between 2 mm and 12 mm and the length measuring between 5 mm and 20 mm. The first trough-shaped conduit also has a length and a width, the length measuring between 25 mm and 50 mm and the width measuring between 1 mm and 10 mm. The first trough-shaped conduit 112 is disposed along a first shell surface 114 (e.g., a bottom) and is connected to the first shell 110 at a first shell end 116. The connection between the first shell 110 and the first conduit 112 is made by a connective bridge at the first shell end 116.

The second metallic portion 104 includes a second trough-shaped shell 120 and a second trough-shaped conduit 122. The second metallic portion 104 is aligned with and spaced from the first portion 102 at the first shell end 116. The first portion 102 is separated from the second portion by a space 146 between the first shell end 116 and the second shell end 126. The first conduit 112 and the second conduit 122 extend further into the space 146 than the first shell 110 and the second shell 120. The space 146 measures in a range from 1 mm to 8 mm. The second trough-shaped conduit 122 is disposed along a second shell surface 124 (e.g., a bottom) and is connected to the second shell 120 at a second shell end 126. The connection between the second shell 120 and the second conduit 122 is made by a connective bridge at the second shell end 126. The first conduit 112 and the second conduit 122 both have a clearance above the first shell surface 114 and the second shell surface 124, respectively. The clearance has a height, measuring between 0.50 mm and 3 mm.

The first conduit 112 has a first pair of indented sidewalls 118, and the second conduit 122 has a second pair of indented sidewalls 128. The first pair of indented sidewalls 118 and the second pair of indented sidewalls 128 both include a sidewall with a hooked portion 142 at the first shell end 116 and the second shell end 126, respectively. The first pair of indented sidewalls 118 includes another sidewall, the other sidewall from each pair having a top that slopes down into a lower portion at the first shell end 116. The hooked portion 142 extends over a trough 144 defined by the first and second trough-shaped conduits 112 and 122. Although not illustrated in FIG. 1, due to limitations imposed by the perspective, the trough 144 exists in both the first trough-shaped conduit 112 and the second trough-shaped conduit 122. Additionally, the first and second pair of indented sidewalls 118 and 128 each include another sidewall, the other sidewall from each pair having a top that slopes down into a lower portion at the first and second shell ends 116 and 126, respectively. Additionally or alternatively, the first shell 110 and the second shell 120 both include sides with crenellated tops and, at the first shell end 116 and the second shell end 126, a beveled edge. The crenellated tops and beveled edge are configured to grip on to a molded support structure (e.g., a heat-shrink tube) which is wrapped around the center of the antenna 100 and configured to assist in holding together the first metallic portion 102 and the second metallic portion 104.

The first pair of indented sidewalls 118 and the second pair of indented sidewalls 128 have a space between them and the enclosing sides with crenellated tops, which belong to the first shell 110 and to the second shell 120, respectively. The space measures between 0.25 mm and 3 mm.

Figure 3:
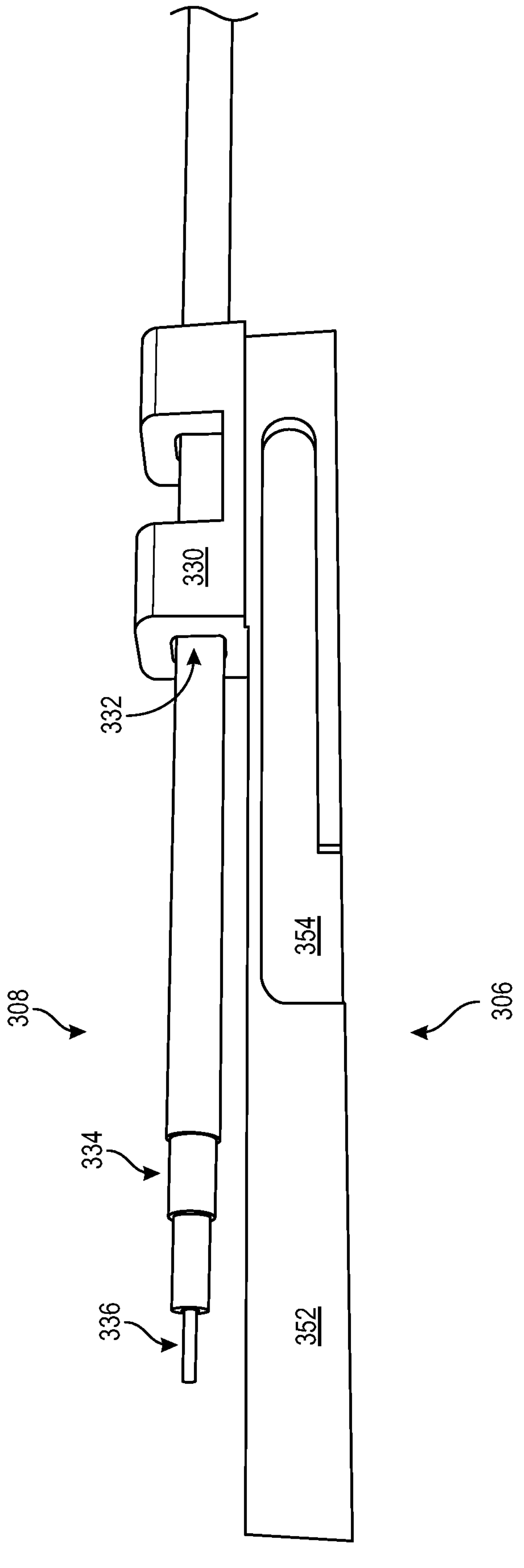
FIG. 3 is a drawing illustrating an example plastic insert and a cable for reducing electromagnetic interference in an antenna, in accordance with one or more embodiments.

The plastic insert 106, which is illustrated in greater detail in FIG. 3, has sides with grooves. The insert 106 has a length measuring between 20 mm and 35 mm. The insert 106 is attached to the first pair of indented sidewalls 118, coupling the first portion 102 to the second portion 104. The grooves are configured to interlock with the first pair of indented sidewalls 118 of the first conduit 112. The plastic insert 106 fits within the trough 144 of the first trough-shaped conduit 112 and runs underneath the hooked portion 142 of the first conduit 112 and underneath the hooked portion 142 of the second conduit 122. The insert 106 also includes a segment 130 defining an eye 132.

The cable 108 passes through the eye 132 and communicate signals. The cable 108 includes an electrically insulative shielding 134 configured to be grounded to the first conduit 112, and an electrically conductive core 136 encapsulated by the shielding 134 and configured to be connected to the second conduit 122. The cable 108 grounds to the first conduit 112 at its hooked portion 142, and the cable 108 electrically connects to the second conduit 122 at its hooked portion 142.

Figure 2:
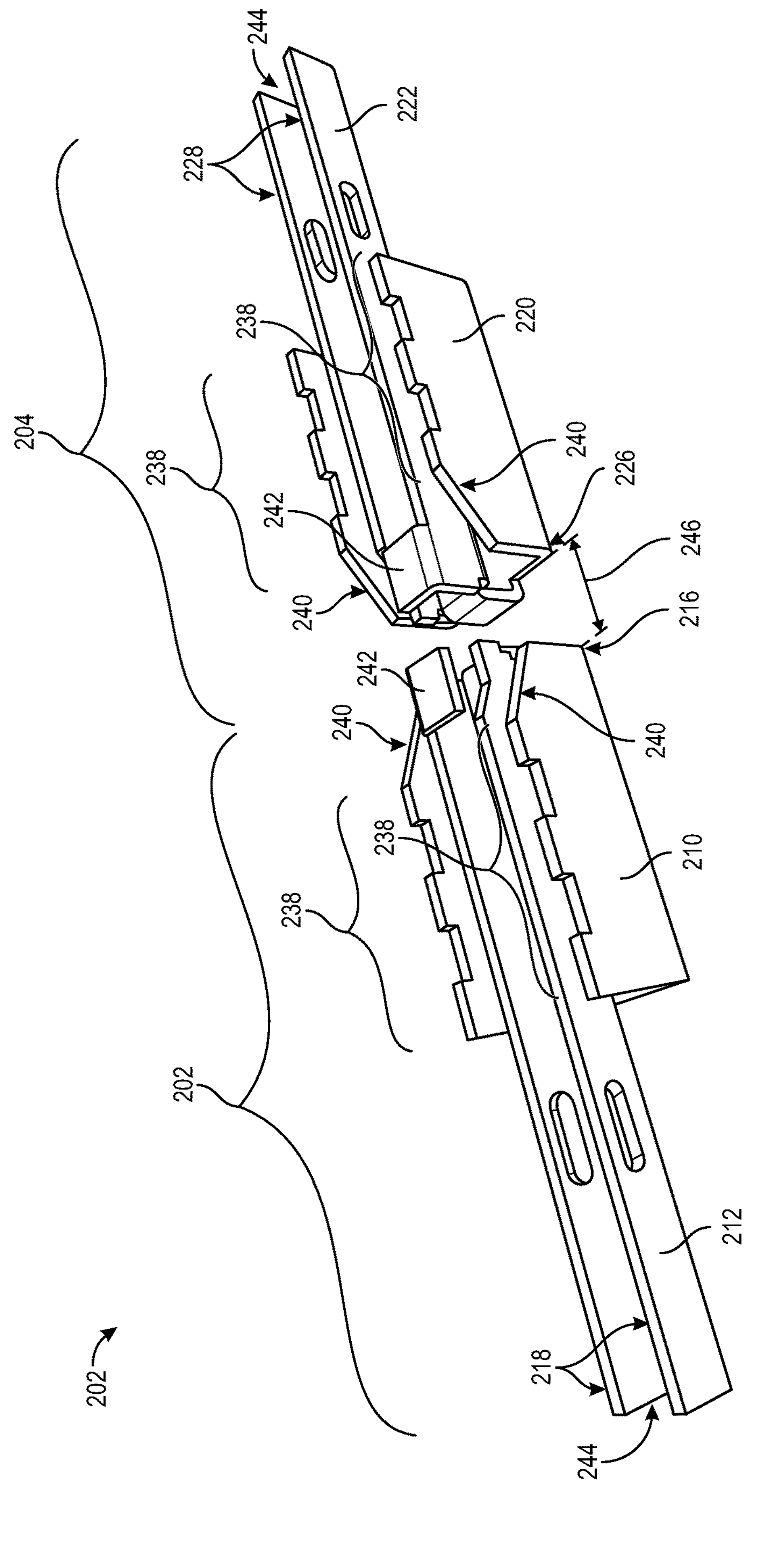
FIG. 2 is a drawing illustrating an example first metallic portion and an example second metallic portion, both metallic portions belonging to an example antenna, in accordance with one or more embodiments.

FIG. 2 is a drawing illustrating an example first metallic portion 202 and an example second metallic portion 204, both metallic portions belonging to an example antenna 200, in accordance with one or more embodiments. The antenna 200 also includes a plastic insert and a cable. The first metallic portion 202 and the second metallic portion 204 include a material or a combination of materials from the following list: copper, annealed copper, stainless steel, gold, silver, aluminum, calcium, tungsten, zinc, nickel, or iron, or some alloy or mixture of the foregoing metals, or barium carbonate, silicon dioxide, yttrium oxide, or other advanced ceramic materials, or carbon nanotube hybrids.

The first metallic portion 202 possesses a first trough-shaped shell 210 and a first trough-shaped conduit 212. The first trough-shaped shell 210 has a width and a length, the width measuring between 2 mm and 12 mm and the length measuring between 5 mm and 20 mm. The first trough-shaped conduit 212 also has a length and a width, the length measuring between 25 mm and 50 mm and the width measuring between 1 mm and 10 mm. The first trough-shaped conduit 212 is disposed along a first shell surface (e.g., a bottom) and is connected to the first shell 210 at a first shell end 216. The connection between the first shell 210 and the first conduit 212 is made by a connective bridge at the first shell end 216.

The second metallic portion 204 includes a second trough-shaped shell 220 and a second trough-shaped conduit 222. The second metallic portion 204 is aligned with and spaced from the first portion 202 at the first shell end 216. This spacing is made by a gap 246 between the first metallic portion 202 and the second metallic portion 204 at the first shell end 216 and the second shell end 226, respectively. The first conduit 212 and the second conduit 222 extend further into the gap 246 than the first shell 210 and the second shell 220. The gap 246 measures between 1 mm and 8 mm. The second trough-shaped conduit 222 is disposed along a second shell surface (e.g., a bottom) and connected to the second shell 220 at a second shell end 226. The connection between the second shell 220 and the second conduit 222 is made by a connective bridge at the second shell end 226. The first conduit 212 and the second conduit 222 both have a clearance above the first shell surface 214 and the second shell surface 224, respectively. The clearance has a height, measuring between 0.50 mm and 3 mm.

The first conduit 212 has a first pair of indented sidewalls 218, and the second conduit 222 has a second pair of indented sidewalls 228. The first pair of indented sidewalls 218 and the second pair of indented sidewalls 228 both include a sidewall with a hooked portion 242 at the first shell end 216 and the second shell end 226, respectively. The hooked portion 242 extends over a trough 244 defined by the first and second trough-shaped conduits 212 and 222. Additionally, the first and second pair of indented sidewalls 218 and 228 each include another sidewall, the other sidewall from each pair having a top that slopes down into a lower portion at the first and second shell ends 216 and 226, respectively. Additionally or alternatively, the first shell 210 and second shell 220 further includes crenellated sidewalls 238 and, at the first shell end 216 and second shell end 226, a beveled edge 240. The crenellated sidewalls 238 and beveled edge 240 are configured to grip on to a molded support structure (e.g., a heat-shrink tube) which is affixed around the center of the antenna 200 and configured to assist in holding together the first metallic portion 202 and the second metallic portion 204.

The first pair of indented sidewalls 218 and the second pair of indented sidewalls 228 have a space between them and the enclosing crenellated sidewalls 238, which belong to the first shell 210 and to the second shell 220, respectively. The space measures between 0.25 mm and 3 mm.

FIG. 3 is a drawing illustrating an example plastic insert 306 and a cable 308 for reducing electromagnetic interference in an example antenna 300, in accordance with one or more embodiments. The example antenna 300 further includes a first metallic portion, a second metallic portion, and a cable.

The plastic insert 306 includes one or more of the following materials from this list: Acrylonitrile butadiene styrene (ABS), polycarbonate, acrylic-polyvinyl chloride thermoplastic, recycled thermoplastics, Thermoplastic Polyolefin, amorphous blends of polyphenylene ether resin and polystyrene, amorphous thermoplastic polyetherimide, Polytetrafluoroethylene, other amorphous thermoplastics, high-performance polyaryletherketones, fluoropolymers, or electromagnetically transparent plastics with dielectric properties. The cable 308 includes a coaxial cable, the coaxial cable having a length of 5 mm, 50 mm, 100 mm, 150 mm, 200 mm, 250 mm, or 500 mm, or some intermediate length encompassed by the range of foregoing lengths.

The plastic insert 306 has sides 352 with grooves 354. The insert 306 has a length measuring between 20 mm and 35 mm. The grooves 354 are configured to interlock with a pair of indented sidewalls belonging to a conduit which forms a part of the antenna 300, and the plastic insert 306 fits within a trough belonging to the conduit. The insert 306 also includes a segment 330 defining an eye 332.

The cable 308 passes through the eye 332 and communicate signals. The cable 308 includes an electrically insulative shielding 334 configured to be grounded to one part of the antenna 300. The cable 308 also includes an electrically conductive core 336 encapsulated by the shielding 334 and configured to be electrically connected to another separate part of the antenna 300.

Figure 4:
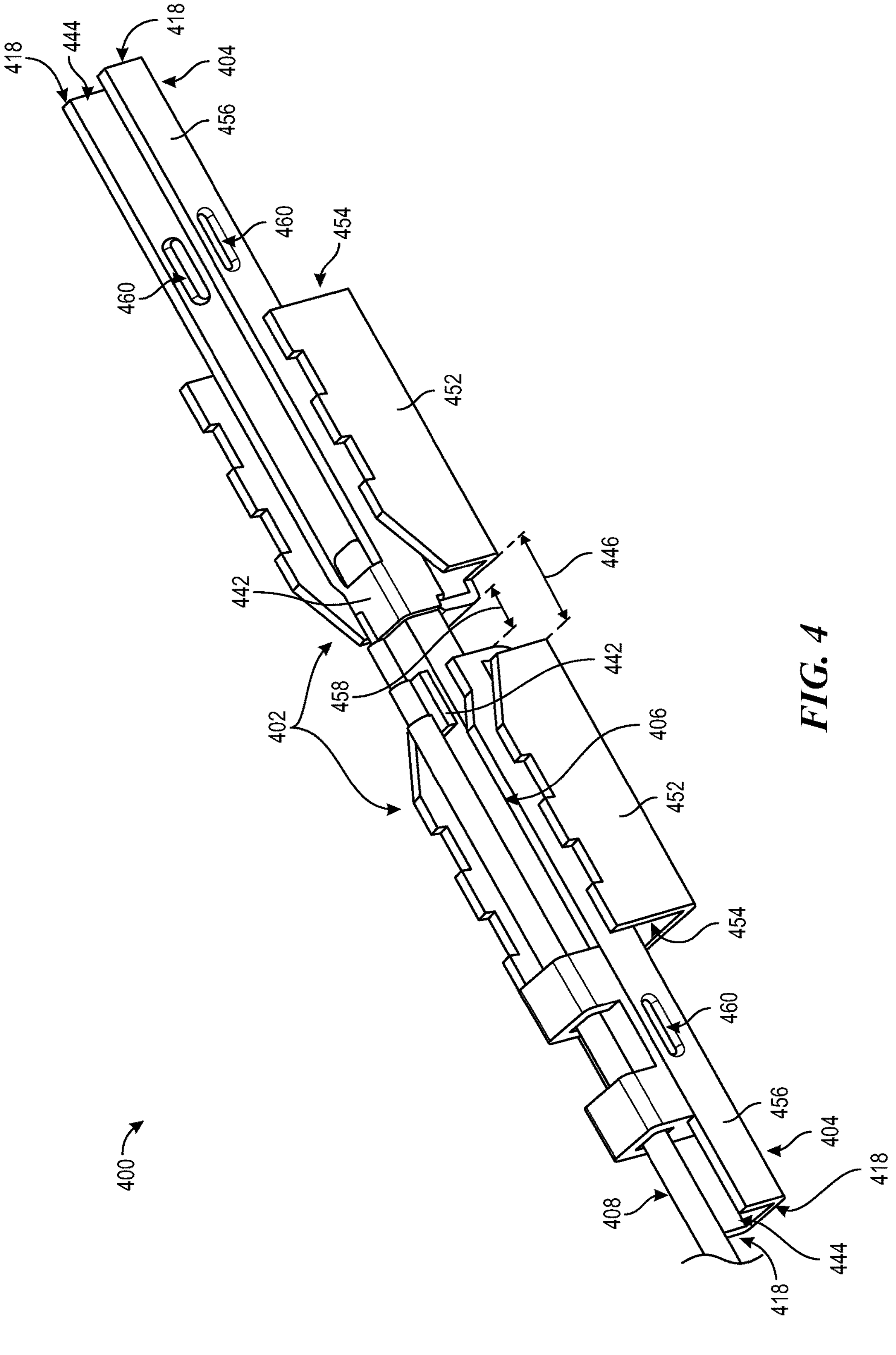
FIG. 4 is a drawing illustrating an example antenna for reducing electromagnetic interference using dielectric inserts with feedline tunnels, in accordance with one or more embodiments.

FIG. 4 is a drawing illustrating an example antenna 400 for reducing electromagnetic interference using dielectric inserts with feedline tunnels, in accordance with one or more embodiments. The antenna 400 includes a first metallic portion, a second metallic portion, a plastic insert 406, and a cable 408. The plastic insert 406 includes a segment 430 defining an eye 432. The cable 408 passes through the eye 432 and communicates signals. The plastic insert 406 includes one or more of the materials from the following list: Acrylonitrile butadiene styrene (ABS), polycarbonate, acrylic-polyvinyl chloride thermoplastic, recycled thermoplastics, Thermoplastic Polyolefin, amorphous blends of polyphenylene ether resin and polystyrene, amorphous thermoplastic polyetherimide, Polytetrafluoroethylene, other amorphous thermoplastics, high-performance polyaryletherketones, fluoropolymers, or electromagnetically transparent plastics with dielectric properties. The cable 408 includes a coaxial cable, the coaxial cable having a length of 5 mm, 50 mm, 100 mm, 150 mm, 200 mm, 250 mm, or 500 mm, or some intermediate length encompassed by the range of foregoing lengths.

The first metallic portion possesses a first trough-shaped shell 410 and a first trough-shaped conduit 412. The first trough-shaped shell 410 has a width and a length, the width measuring between 2 mm and 12 mm and the length measuring between 5 mm and 20 mm. The first trough-shaped conduit 412 also has a length and a width, the length measuring between 25 mm and 50 mm and the width measuring between 1 mm and 10 mm. The first trough-shaped conduit 412 is disposed along a first shell surface 414 (e.g., a bottom) and is connected to the first shell 410 at a first shell end. The connection between the first shell 410 and the first conduit 412 is made by a connective bridge 462 at the first shell end. The connective bridge 462 includes one or more of the materials from the following list: copper, annealed copper, stainless steel, gold, silver, aluminum, calcium, tungsten, zinc, nickel, or iron, or some alloy or mixture of the foregoing metals, or barium carbonate, silicon dioxide, yttrium oxide, or other advanced ceramic materials, or carbon nanotube hybrids.

The first conduit 412 has a clearance 448 above the first shell surface 414. The clearance 448 has a height, measuring between 0.50 mm and 3 mm. Although not illustrated in FIG. 4, due to limitations imposed by the perspective, the second metallic portion has a second conduit and a second shell with a second shell surface; in this embodiment, the second conduit also has a clearance above the second shell surface.

The first conduit 412 has a first pair of indented sidewalls 418. The first pair of indented sidewalls 418 contain a trough 444 defined by the first trough-shaped conduit 412. Additionally, the first shell 410 includes sides with crenellated tops 438. The sides with crenellated tops 438 are configured to grip on to a molded support structure (e.g., a heat-shrink tube) which is wrapped around the center of the antenna 400 and configured to assist in holding together the first metallic portion and the second metallic portion.

The first pair of indented sidewalls 418 have a space 450 between them and the enclosing sides with crenellated tops 438 belonging to the first shell 410. The space 450 measures between 0.25 mm and 3 mm. In some embodiments, the first and second pair of indented sidewalls (e.g., sidewalls 418) each have a sidewall that is angled at the first and second shell ends, respectively.

All of the foregoing features attributed to the first metallic portion can likewise be extended to various embodiments of the second metallic portion, extrapolating from the example antenna 400 illustrated in FIG. 4.

Figure 5:
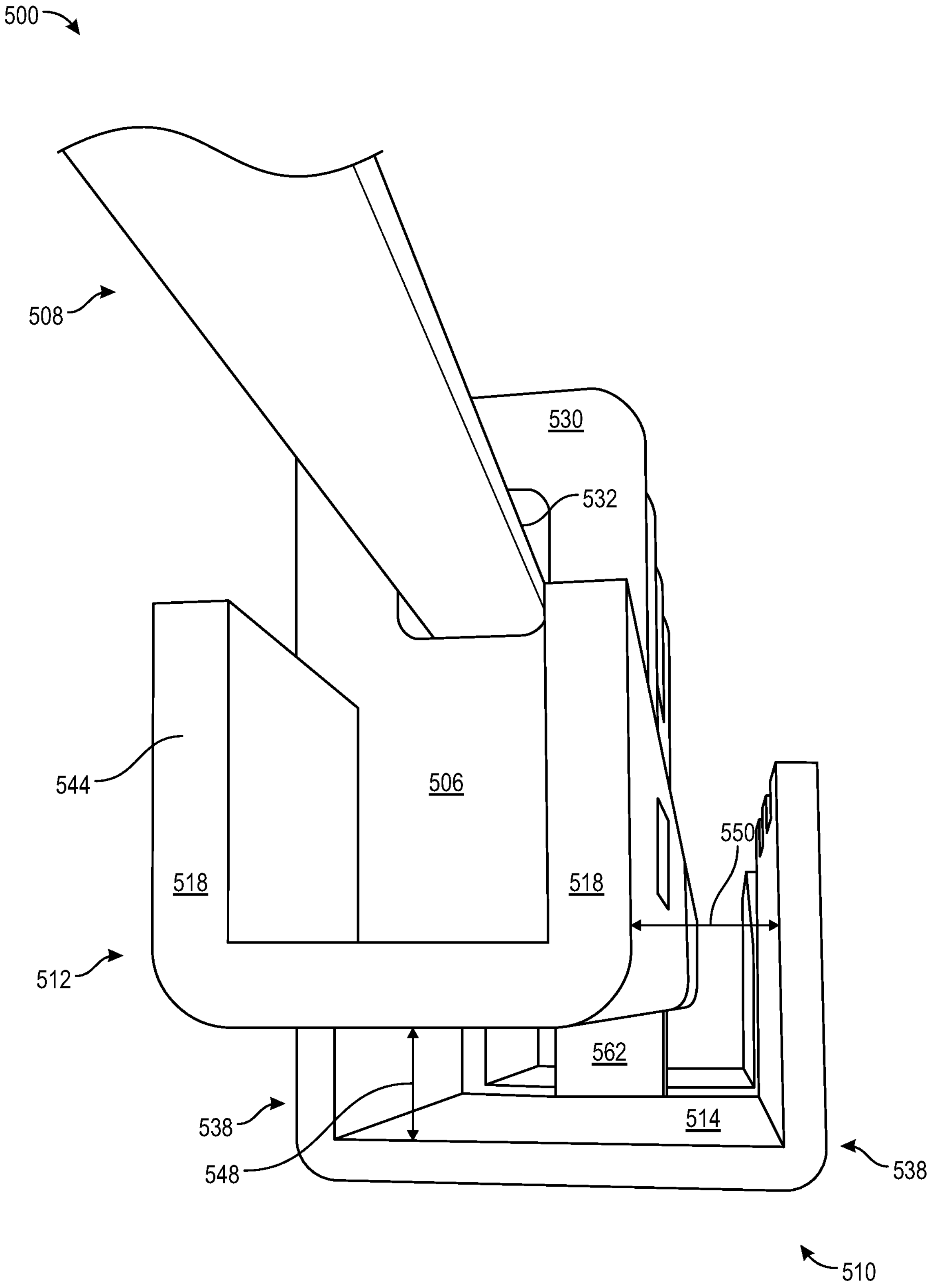
FIG. 5 is a drawing illustrating an example multi-band dipole antenna for reducing electromagnetic interference using dielectric inserts with feedline tunnels, in accordance with one or more embodiments.

FIG. 5 is a drawing illustrating an example multi-band dipole antenna 500 for reducing electromagnetic interference using dielectric inserts with feedline tunnels, in accordance with one or more embodiments. The multi-band dipole antenna 500 includes a first antenna 502 configured to resonate in a first band. The first antenna 502 includes a first pair of arms 552 spaced by a first gap 546 and configured to provide a particular antenna impedance and reactance. Each arm 552 from the first pair has an interior 554. Each arm 552 constitutes one-half of the first antenna 502, which is a single band dipole antenna, and the arms 552 are mirror images of each other in terms of structure. The first band includes a first operating frequency, the first operating frequency measuring 900 MHZ, 2.4 GHZ, 3.65 GHz, 3.7-4.2 GHZ, 4.9-5.0 GHZ, 5 GHZ, 5.9 GHZ, 6 GHZ, or 60 GHz. Each arm from the first pair of arms 552 has a length and a width. The length measures between 5 mm and 20 mm, and the width measures between 2 mm and 12 mm.

The example multi-band dipole antenna 500 includes a second antenna 504 configured to resonate in a second band. The second antenna 504 includes a second pair of arms 556 spaced by a second gap 558. The second antenna 504 is configured to provide a particular antenna impedance and reactance, each arm from the second pair 556 disposed within the interior 554 of a corresponding arm from the first pair 552. Both of the arms from the second pair 556 have a connection pad 542 abutting the second gap 558. The arms 556 also have two sides 518 with indentations 560 that project inward toward a channel 544. The channel 544 is formed by the two sides 518. Each arm 556 constitutes one-half of a single band dipole antenna, the arms 556 being mirror images of each other in terms of structure. The second gap 558 is contained within the first gap 546. Each arm from the second pair of arms 456 has a length and a width, the length measuring between 25 mm and 50 mm, and the width measuring between 1 mm and 10 mm. The second band includes a second operating frequency, the second operating frequency measuring 900 MHZ, 2.4 GHZ, 3.65 GHz, 3.7-4.2 GHz, 4.9-5.0 GHz, 5 GHZ, 5.9 GHZ, 6 GHZ, or 60 GHz. Each arm from the first pair 552 has a bottom, and each arm from the second pair 556 has a clearance over the bottom of a corresponding arm from the first pair, while still being disposed within the interior of that corresponding arm. The clearance of the second pair of arms 556 over the first pair of arms 552 measures 0.5 mm to 3 mm. Each arm from the second pair 556 has a space between its two sides 518 and the interior 554 of the corresponding arm from the first 552. The space measures between 0.25 mm and 3 mm. Additionally, the first gap 546 measures between 1 mm and 8 mm, and the second gap 558 measures between 0.25 mm and 4 mm.

The multi-band dipole antenna 500 includes connective bridges, each bridge joining an arm 552 from the first pair to a corresponding arm 556 from the second pair on either side of the second gap 558. The first antenna 502, the second antenna 504, and the connective bridges include one or more material from the following list: copper, annealed copper, stainless steel, gold, silver, aluminum, calcium, tungsten, zinc, nickel, or iron, or some alloy or mixture of the foregoing metals, or barium carbonate, silicon dioxide, yttrium oxide, or other advanced ceramic materials, or carbon nanotube hybrids.

The example multi-band dipole antenna 500 includes an insert 506. The insert 506 includes sides with grooves and a raised portion with an eye. The insert 506 is configured to fit under and through both connection pads 542 belonging to the second antenna 504. In this way, the insert crosses over the second gap 558 while a majority of the insert 506 is disposed within the channel 544 of a single arm 456 from the second pair. Also, the indentations 560 from that single arm's two sides 518 fit within the grooves of the insert 506. By doing so the indentations 560 and grooves lock the insert 506 in place and hold together the first pair of arms 552 and the second pair of arms 556, from both the first antenna 502 and the second antenna 504. The insert 506 includes one or more of the following materials: Acrylonitrile butadiene styrene (ABS), polycarbonate, acrylic-polyvinyl chloride thermoplastic, recycled thermoplastics, Thermoplastic Polyolefin, amorphous blends of polyphenylene ether resin and polystyrene, amorphous thermoplastic polyetherimide, Polytetrafluoroethylene, other amorphous thermoplastics, high-performance polyaryletherketones, fluoropolymers, or electromagnetically transparent plastics with dielectric properties. The insert 506 has a length, the length measuring between 20 mm and 35 mm.

In some embodiments, the two sides for each arm of the second pair of arms have a space between themselves and the interior of the corresponding arm from the first pair. The space between the sides of each arm from the second pair and the interior of each arm from the first pair can measure between 0.25 mm and 3 mm. The multi-band dipole antenna 500 can include a coaxial cable 508 connected to both connection pads 542 belonging to the second antenna 504, and running through the eye of the insert 506. The coaxial cable 508 can have a length of 5 mm, 50 mm, 100 mm, 150 mm, 200 mm, 250 mm, or 500 mm, or some intermediate length encompassed by the range of foregoing lengths.

Any of the foregoing antenna embodiments, illustrated and described, can be mounted within a Wi-Fi device configured to operate within a telecommunications system. The Wi-Fi device can have an enclosure surrounding a substrate, the substrate including a cavity configured for mounting any of the foregoing antenna embodiments. The cavity can include notches permitting the foregoing antenna embodiments to slide under and through the substrate. Additionally, the foregoing antenna embodiments can be held in the cavity through the use of bindings (e.g., adhesive tape). The Wi-Fi device can comprise multiple Wi-Fi devices, which can include a modem and a router, both configured to act as transmitters and receivers, each with a signal strength. Additionally, the multiple Wi-Fi devices can be separated from each other, and from one or more client devices, by a distance and an obstacle. The distance can measure between 1 ft and 0.4 miles, while the obstacle can include a wall with a thickness between 0.5 in and 5 in, and wherein the signal strength provided by the compact omnidirectional Wi-Fi antenna can measure between 5 dBm and 30 dBm for the transmitters, and between −5 dBm and −70 dBm for the receivers.

The Wi-Fi device can include a communicative coupling to an Internet service provider (ISP) uplink, a first configuration to receive an Internet connection from the ISP uplink using a first Internet uplink Ethernet cable, and a second configuration to share the Internet connection using the first Internet uplink Ethernet cable, as well as to provide wireless connectivity, using the Internet connection, to one or more client devices.

In such a configuration, the antenna can be a compact omnidirectional Wi-Fi antenna belonging to the second configuration, with the antenna having two conductive parts separated by a gap and held together by a dielectric joint, as well as a feedline that is coupled to the two conductive parts, and held in place by the dielectric joint. Each conductive part can comprise a wand disposed within a sleeve, both wands and sleeves connected by links on either side of the gap. The links can hold the wands above the sleeves so that no part of the wands contact any part of the sleeves. The sleeves from both conductive parts can have with tops, the tops having raised upright sections succeeded by indentations and ending in a beveled edge at the gap. The wands from both conductive parts can have sides with tops, those sides having indentations directed toward an interior of each wand, and those tops having curved portions at the gap configured to form connective pads. The dielectric joint from the compact omnidirectional Wi-Fi antenna can include sides with grooves and a raised portion with a tunnel. The joint can fit under the connective pads belonging to the wands, so that the joint extends across the gap and a majority of the joint is disposed within one wand from one of the conductive parts. The indentations from that wand can be configured to fit within the joint's grooves. The feedline can be configured to bond to the connective pads. Additionally, the feedline can run above the wand, which holds the majority of the dielectric joint, as the feedline can be circumscribed and held in place by the tunnel belonging to the joint.

Figure 6:
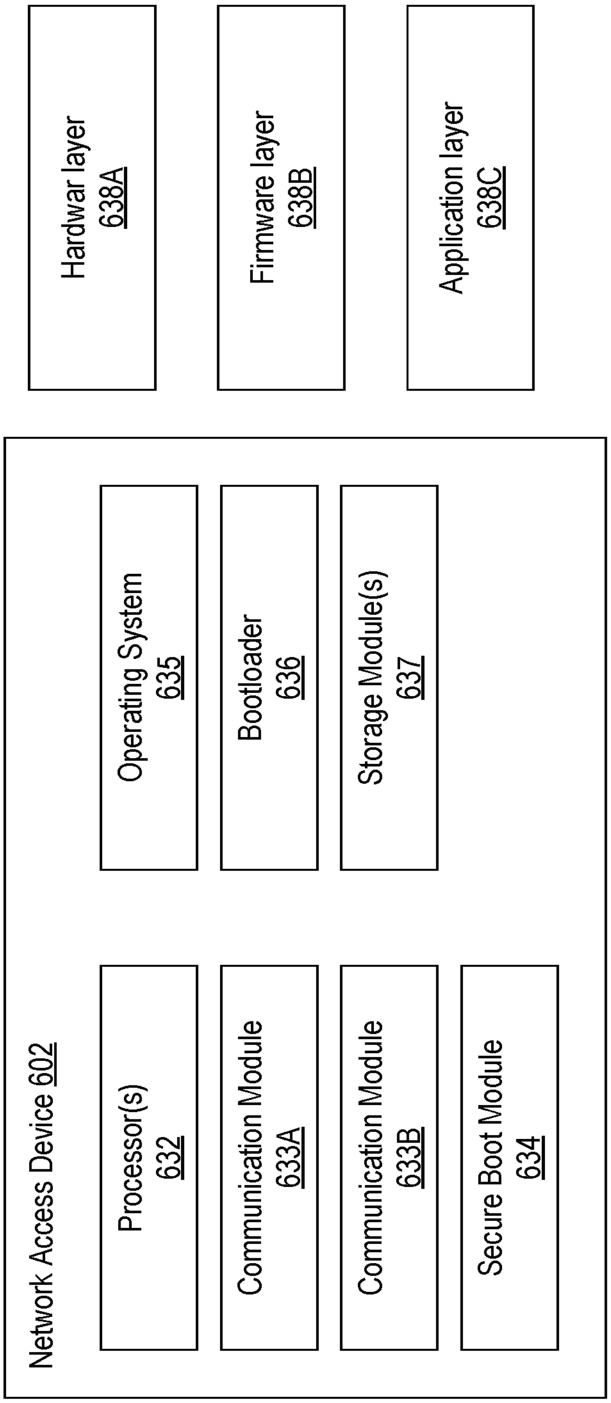
FIG. 6 is a block diagram illustrating an example network access device in accordance with one or more embodiments.

FIG. 6 is a block diagram illustrating an example network access device 602 in accordance with one or more embodiments. In embodiments, the network access device 602 facilitates connections between electronic devices (e.g., personal computers, mobile phones, wearable items) and a network. The network access device 602 may be, for example, a router, modem, switch, AP, etc. Some embodiments are described in the context of a router for purpose of illustration only. Those skilled in the art will recognize that similar technology may be used in conjunction with other types of network access devices. Network access device 602 can use, for example, the antennae illustrated and described in more detail with reference to FIGS. 1-5. Network access device 602 is implemented using the components of the example computer system 600 illustrated and described in more detail with reference to FIG. 6. Likewise, embodiments of network access device 602 can include different and/or additional components or can be connected in different ways.

Network access device 602 can include one or more processors 632, communication module(s) 633A-B, a secure boot module 634, an operating system 635, a bootloader 636, and one or more storage modules 637.

Processor(s) 632 can execute instructions stored in the storage module(s) 637, which can be any device or mechanism capable of storing information. In some embodiments a single storage module includes multiple computer programs for performing different operations (e.g., establishing a communication channel with an electronic device, examining data packets within received traffic, etc.), while in other embodiments each computer program is hosted within a separate storage module.

In some embodiments, the network access device 602 may include at least three layers: a hardware layer 638A, a firmware layer 638B, and an application layer 638C. The hardware layer 638A of a network access device 602 may include the physical chipset-level of the network access device. A boot certificate (also referred to as a "birth certificate") may be "sewn" or "burned" into the hardware layer 638A of the network access device 602. For example, the boot certificate may be burned in a chipset-level location within the hardware layer 638A of the network access device. The boot certificate may include registration information that can be embedded within a secure, chipset-level location known only to the manufacturer.

The boot certificate may include information indicative of identifying the network access device 602. The boot certificate may include a serial number, license key, or other identifying information to identify the network access device 602. The boot certificate may verify physical ownership of the network access device 602, as the boot certificate may be physically stored on the hardware layer 638A of the network access device 602.

The hardware layer 638A of the network access device 602 may include a hash key programmed in one-time programmable (OTP) memory. OTP memory may include non-volatile memory that permits data to be written to memory only once. OTP memory may be utilized during manufacturing of the network access device 602 to upload firmware onto the network access device 602. In some embodiments, if the network access device 602 receives firmware, the OTP memory can upload the firmware to the network access device 602. The OTP memory may include the boot certificate. When the network access device 602 leaves a manufacturing facility, the network access device 602 may include a birth certificate and firmware signed with an intermediate digital certificate.

The network access device 602 may include a firmware layer 638B. The firmware layer 638B may require that any firmware installed onto the network access device 602 be digitally signed to prevent any unauthorized entity from accessing and/or installing firmware onto the network access device.

In some embodiments, the network-accessible server system may periodically transmit updated firmware to the network access device 602. Each time updated firmware is transmitted from the network-accessible server system, the network-accessible server system may digitally sign the updated firmware.

The network access device 602 may include an application layer 638C. The application layer 638C may facilitate interaction with a mobile application to modify the settings of the network access device 602. The application layer 638C may include applications that can be read by, for example, a secure boot module 634. These applications can be developed by the manufacturer or a third party. While a mobile application may connect to the application layer 638C of the network access device 602, the application layer may be prevented from being activated until after the network access device 602 verifies that the application has been signed by the manufacturer. The application layer 638C may not connect to the mobile application until a digital certificate is distributed to the network access device 602.

The network access device 602 may include one or more communication modules 633A-B. Here, for example, the network access device 602 includes multiple communication modules 633A, 633B, which may be designed to communicate in accordance with different communication protocols. However, the network access device 602 could include a single communication module capable of communicating in accordance with multiple communication protocols or communicating along separate threads and/or frequency bands in accordance with a single communication protocol. The communication module(s) 633A-B can facilitate communication between various components of the network access device 602. Generally, the communication module(s) 633A-B communicate with other electronic device(s) by transmitting data wirelessly via an antenna. In some embodiments, the network access device 602 includes multiple antennas designed for communicating in accordance with various communication protocols described herein.

A first communication module 633A may route and/or forward network traffic between one or more electronic devices and a network, such as the Internet. For example, the communication module 633A may facilitate electronic communication with a mobile tablet computer, or wearable item seeking to establish a connection with a network to which the network access device 602 is connected.

A second communication module 633B may route and/or forward local data packets between a computer program executing on an electronic device and a manufacturer platform executing on a network-accessible server system. The local data packets received at the network access device 602 may include provisioning and settings customization of the network access device 602. In some embodiments, the second communication module 633B may utilize a short-range wireless communication protocol to communicate with the computer program.

The secure boot module 634 can be configured to, upon startup, verify that firmware residing on the network access device 602 has been digitally signed. For example, the secure boot module 634 may examine the signature of the bootloader 636 to verify that it hasn't been modified. If the bootloader 636 is fully intact, the secure boot module 634 may permit the bootloader 636 to initiate the operating system 635.

Upon initialization of an acquired device (e.g., a network access device), the network access device may be onboarded onto a network. A manufacturer-authorized device may onboard and provision the network access device. An example of a manufacturer-authorized device is a computing device that is authorized by the manufacturer to securely provision and boot a device, such as a network-accessible server system. A network access device, such as a router, may initially connect to the manufacturer-authorized device during the start-up or initialization process (e.g., upon booting). When the network access device connects to the manufacturer-authorized device, the manufacturer-authorized device may authenticate the network access device. Authenticating the network access device may include inspecting the network access device to verify the identity of the network access device.

Generally, network access devices, during initialization, may be vulnerable to unauthorized access. A remote entity may attempt to access the network access device or transmit malware to the network access device upon boot. To address such vulnerabilities, network access devices may include authorization by a manufacturer-authorized device before the network access device is permitted to connect to a network.

Additionally, in many areas where a network access device is provisioned, there may be insufficient coverage to allow for the electronic device to communicate with a cellular node over a wireless cellular network. If the electronic device is unable to connect to a wireless cellular network and transmit a request to the manufacturer-authorized device, the secure boot process initiated by the network access device may be unsuccessful.

To address the inconsistent coverage of an electronic device to connect to a wireless network, a network-accessible server system may establish a geographical location of the network access device and a geographical location of an electronic device and determine that the geographical location of the network access device and the geographical location of the electronic device are within a predetermined proximity of one another. In some embodiments, establishing the geographical location of the electronic device includes examining an IP address of the network access device. In other embodiments, it is determined that the network access device and the electronic device are communicatively coupled via a short-range wireless communication protocol, such as Bluetooth®, for example. This allows the network-accessible server system to determine that the electronic device is within a certain proximity of the network access device due to the connectivity range limits on such a short-range wireless communication protocol.

Figure 7:
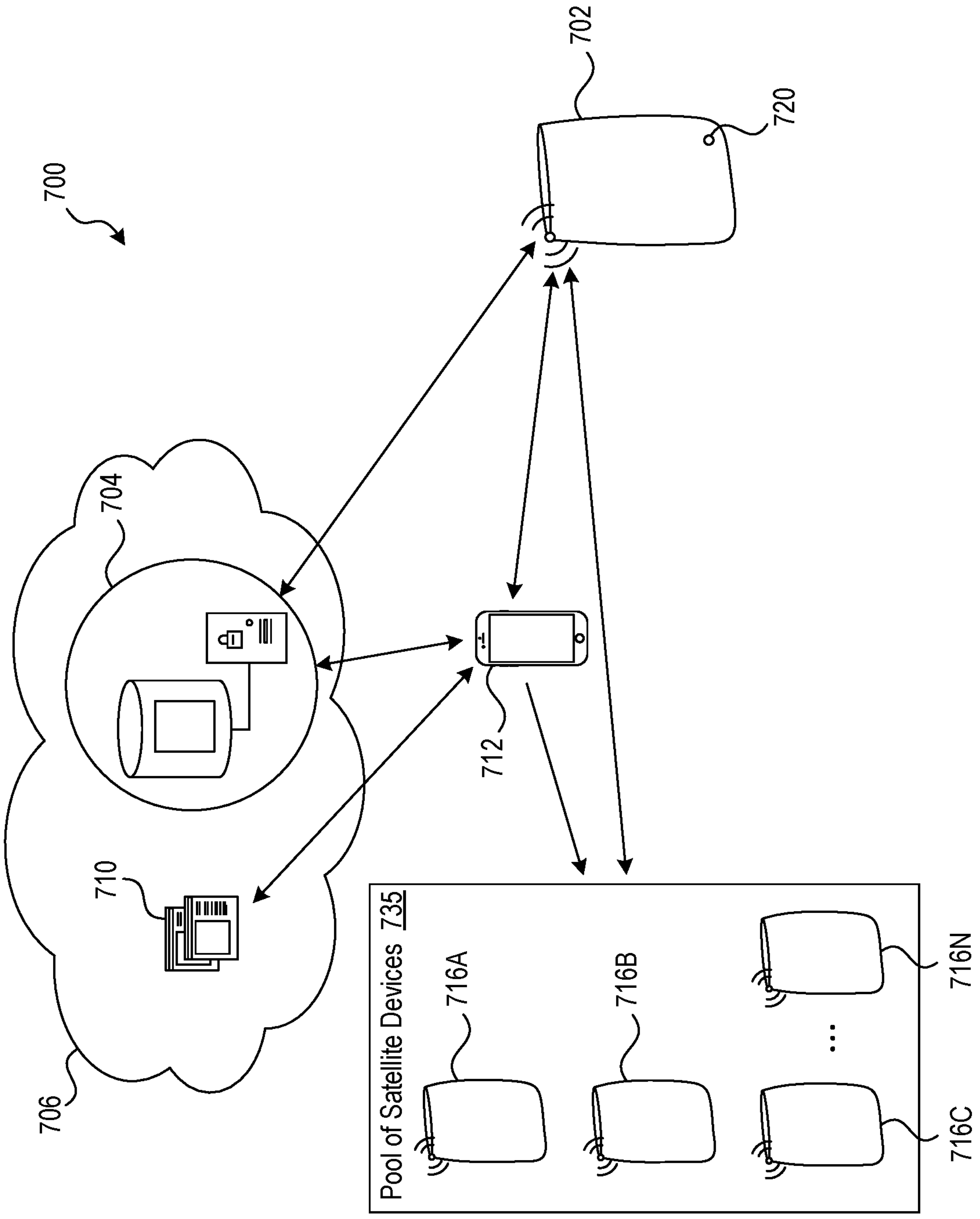
FIG. 7 is a drawing illustrating an example network environment, in accordance with one or more embodiments.

FIG. 7 is a drawing illustrating an example network environment 700, in accordance with one or more embodiments. The network environment 700 includes one or more satellite networking devices (or simply "satellite devices"), consistent with various embodiments. The devices of the network environment 700 can use the antennae illustrated and described in more detail with reference to FIGS. 1-5. In accordance with embodiments herein, a satellite device is a network-enabled device that is configured to forward network data between the network access device and local electronic devices connected to the satellite device. In an embodiment, the satellite device may be configured to direct network data to the network access device, where the network access device transmits/receives network data from the network, such as the Internet. Typically, the satellite device is used to improve the existing abilities of the network access device by extending the range or improving the signal strength of a network and so on.

In an embodiment, the environment 700 may include a network access device 702, a computer program 710 executing on an electronic device 712, a network-accessible server system 704, and at least one satellite device (e.g., 716A-N from a pool of satellite devices 735). It should be appreciated that a typical networked environment (house, building) may have one or two satellite devices. However, an embodiment contemplates many satellite devices, such as N number of devices as depicted by Nth satellite device 716N. In an embodiment, network-accessible server system 704 includes a management platform (not shown), which is communicably connected to any of, all of, or any combination of: a computer program 710, an application on network access device 702 (not shown), and an application on at least one satellite device 716A-N. Thus, any reference herein to network-accessible server system 704 may include the management platform.

In some embodiments, a satellite device, such as first satellite device 716A, may be configured to facilitate communication between electronic devices (e.g., personal computers, mobile phones, wearable items) and a network. For example, in an embodiment, first satellite device 716A is configured to communicate with computer program 710 on electronic device 712. First satellite device 716A may be configured and used to improve the existing abilities of the network access device 702 by extending the range or improving the signal strength of the network.

Any satellite device 716A-N may communicatively couple to the network access device 702, and the network access device 702 may direct network data transmitted by such satellite devices. Satellite device(s) 716A-N may communicate with the network access device 702 via a suitable wireless communication protocol as described herein. Also, in an embodiment, any satellite device in the pool of satellite devices 735 may communicatively couple to another and different satellite device in the pool satellite devices 735 for the purposes of communicating with the network access device 702. For example, first satellite device 716A and second satellite device 716B may be configured in a series topology, and so on. In this example, second satellite device 716B sends data that is intended for network access device 702 directly to first satellite device 716A, first, and first satellite device 716A forwards the data on to network access device 702.

The network access device 702 may connect to one or more satellite device(s) 716A-N. Each satellite device (e.g., first satellite device 716A) communicably connected to the network access device 702 may be identifiable by the network access device 702. The network access device 702 may receive identification information from the satellite device (e.g., first satellite device 716A) upon being communicably connected to the satellite device. Identification information may include a boot certificate of the satellite device (e.g., first satellite device 716A), where the boot certificate is stored in the satellite device, for example. Or, the identification may include permission to access the boot certificate related information in storage in the manufacturer's cloud system. Identification information may include a satellite device serial number or IP address, for example.

One or more satellite devices may connect to the network access device 702 via a tree network topology. In a tree topology, each satellite device is configured to transmit network data to each of the other satellite devices and to the network access device. The network access device 702 is configured to transmit the network data to the network. First satellite device 716A, second satellite device 716B, and third satellite device 716C are each communicably connected to network access device 702 via network 704D. In addition, first satellite device 716A is communicably connected to second satellite device 716B via wireless communication and to the third satellite device 716C via wireless communication. Second satellite device 716B also is communicably connected to third satellite device 716C via wireless communication. Network access device 702 may be configured to further transmit the network data to the network (not shown). Multiple satellite devices may be interconnected, where each satellite device forwards network data through the tree network to the network access device 702. Multiple satellite devices may be interconnected across a tree network environment, such as a building, for example. The tree network may allow for multiple satellite devices to be interconnected, where the range of the wireless network may be extended due to the interconnectivity of multiple satellite devices located across the network environment.

One or more satellite devices may connect to the network access device 702 via a hub-and-spoke or star topology. In a hub-and-spoke topology, each satellite device is configured to transmit network data to the network access device and the network access device is configured to transmit the network data to the network. First satellite device 716A is communicably connected to network access device 702 via a first wireless communication. Second satellite device 716B is communicably connected to network access device 702 via a second wireless communication. Third satellite device 716C is communicably connected to network access device 702 via a third wireless communication. Network access device 702 is configured to further transmit the network data to the network (not shown).

An electronic device 712 may communicatively couple to one or more satellite devices 716A-N. For example, the electronic device 712 may connect to the first satellite device 716A or the second satellite device 716B. In an embodiment, the electronic device may communicably connect to the satellite devices of the pool of satellite devices via a separate connection with each satellite device. For example, electronic device 712 may connect to the first satellite device 716A and connect to the second satellite device 716B via separate connections (not shown) over a network. The first satellite device 716A may receive network data from the electronic device 712 and direct the network data to the network access device 702. In a tree network architecture/topology, one satellite device may receive network data from another satellite device that was originally from an electronic device over a network and may forward the network data to the network access device. For instance, the first satellite device 716A may receive network data from second satellite device 716B, which originally received the network data from electronic device 712, and the first satellite device 716A may forward the network data to the network access device 702. In an embodiment, electronic device 712 may also communicably connect to the network-accessible server system 704 via the network. A network can represent communication using networking protocol or it can represent cellular protocols. Or, a network can represent communication using both types of protocols. One skilled in the art can understand which protocol is being used, depending on the context. Further, electronic device 712 and network access device 702 may be communicably connected via a network. In an embodiment, network-accessible server system 704 is communicably connected to network access device 702.

An embodiment of a high-level process for onboarding or booting a satellite device can be understood with reference to FIG. 7. It should be appreciated that the particulars are for illustrative purposes and are not meant to be limiting. For purposes of discussion, it is assumed that second satellite device 716B has not yet been provisioned, but a user desires to do so. Second satellite device 716B becomes alive, for example by the user turning on the device. It should further be appreciated that second satellite device 716B does not connect to any port of network access device 702 and, therefore, does not have or obtain Internet connectivity of its own.

Upon activation, second satellite device 716B electronically communicates with electronic device 720, which is within a predetermined range or proximity, by way of short-range wireless communication protocol, such as Bluetooth® Low Energy (BLE), for example. More specifically, second satellite device 716B is configured to communicate with computer program 710 and computer program 710 is also configured to receive and process communication from second satellite device 716B. In an embodiment, second satellite device 716B was previously provisioned, e.g., by the manufacturer, with a unique certificate. That is, a satellite boot certificate (also referred to as a satellite "birth certificate") may have been embedded, e.g., sewn or burned, into the hardware layer of second satellite device 716B. The satellite boot certificate may include registration information that can be embedded within a secure, chipset-level location known only to the manufacturer. Thus, in response to being activated, second satellite device 716B transmits its satellite boot certificate to computer program 722. The registration information of second satellite device 716B can be stored on any of the devices in the environment, such as network-accessible server system 704, electronic device 720, or network access device 702. It should be appreciated that upon activation, second satellite device 716B may also send signals to network access device 702, however, network access device 702 can be configured to ignore such signals until certain conditions are met as described below.

Upon receipt of the satellite boot certificate, computer program 710 transmits the satellite birth certificate and appropriate credentials of computer program 710 to network-accessible server system 704. In a different embodiment, upon a type of notification, computer program 710 transmits data, identifying that the user is in possession of second satellite device 716B, to network-accessible server system 704. For example, a user can take a photograph of the serial number of the second satellite device 716B and transmit the photograph along with the appropriate credentials of computer program 710 to network-accessible server system 704. In another embodiment, computer program 710 accesses a birth certificate of second satellite device 716B stored on electronic device 720 or network access device 702 and transmit the accessed birth certificate along with the appropriate credentials of computer program 710 to network-accessible server system 704.

Upon receipt of the satellite boot certificate or data indicating that the user is in possession of second satellite device 716B and the credentials of computer program 722, network-accessible server system 704 verifies, using the received credentials, that computer program 710 is a valid application in its system. Also, network-accessible server system 704 verifies that the satellite boot certificate, or data indicating that the user is in possession of second satellite device 716B, is legitimate. For instance, one or more verified satellite boot certificates may be listed on a satellite boot certificate registry on or associated with network-accessible server system 704. Network-accessible server system 704 compares the received satellite boot certificate to a satellite boot certificate stored in the satellite boot certificate registry. Upon a match, network-accessible server system 704 knows that the received satellite boot certificate is valid. As an example, and for illustrative purposes, a satellite boot certificate can contain or be associated with a serial number of second satellite device 716B. In another embodiment, network-accessible server system 704 compares the received data indicating the user is in possession of second satellite device 716B with previously stored data. Upon a match, network-accessible server system 704 knows that the received data indicating the user is in possession of second satellite device 716B is valid. Examples of credentials of computer program 710 may include, but are not limited to, username and password or any identifier agreed upon between computer program 710 and network-accessible server system 704. It should be appreciated that confirming that the user of the computer program 710 is valid, and that the user is in possession of the satellite device, may be performed in a particular sequence or in parallel.

Upon verifying that the user of computer program 710 is valid and that the satellite boot certificate or possession of second satellite device 716B is confirmed, network-accessible server system 704 associates second satellite device 716B with computer program 710 and/or network access device 702 for further communication.

In an embodiment, upon associating computer program 710 and second satellite device 716B, network-accessible server system 704 pushes a digital certificate intended for second satellite device 716B through or via network access device 702. In another embodiment, upon associating computer program 710 and second satellite device 716B, network-accessible server system 704 grants permission for second satellite device 716B to have access to network access device 702. For example, network-accessible server system 704 may send a notification to network access device 702 to accept any requests by second satellite device 716B for access to the network. In another embodiment, upon receiving a request from second satellite device 716B to access the network, network access device 702 may transmit a verification request to network-accessible server system 704 or to computer program 710 intended for network-accessible server system 704. Upon receiving such verification request, network-accessible server system 704 can check whether second satellite device 716B is an associated device. When second satellite device 716B is an associated device, network-accessible server system 704 can send a notification indicating that permission to access the network is granted. When second satellite device 716B is not an associated device, network-accessible server system 704 can send a notification indicating that permission to access the network is denied.

A specialized public key infrastructure (PKI) accessible to the network-accessible server system 704 can be configured to facilitate the distribution of online certificates, each of which may include a public encryption key, to the network access device(s), mobile application(s), and/or satellite device(s) associated with a local network. The network-accessible server system may communicate with the PKI via application programming interfaces (APIs), bulk data interfaces, etc. Generally, the network-accessible server system 704 will request a separate certificate for each mobile application and satellite device. For example, if the network access device is set up to be connected to a single mobile application and four satellite devices distributed throughout an environment (e.g., a home), then the network-accessible server system 704 may request five certificates and distribute a unique certificate to the mobile application and satellite devices.

Intermediate digital certificates may be distributed by one of the network-accessible server system 704. Intermediate digital certificates may be generated for firmware verification. The intermediate digital certificates may include information indicative of identifying the network-accessible server system 704. The network-accessible server system 704 may digitally sign the firmware by providing information identifying the network-accessible server system 704 on the intermediate digital certificate. The network access device may receive the intermediate digital certificate and determine that the firmware has been digitally signed and is verified.

Upon receiving the digital certificate, second satellite device 716B may have access to the Internet by using network access device 702. In an embodiment, if network access device 702 is not within communication range of second satellite device 716B, second satellite device 716B may communicate with network access device 702 by using a satellite device, for example as in a daisy chain configuration or tree configuration. For example, in a user's household, the user's router (user's network access device) may be physically in the basement floor and the user's satellite device is in the upstairs kitchen. Thus, as the user walks up the stairs from the basement to one of the upstairs rooms, the user's cell phone access to the Internet may switch from being communicably connected directly to the user's router to being communicably connected directly to the user's satellite device, which is communicably connected directly to the user's router. To continue with the example, as the user walks downstairs, the user's cell phone access to the Internet may switch again from being communicably connected directly to the user's satellite device to being communicably connected directly to the user's router.

An automatic firmware update process and system is provided according to one or more embodiments. Providing for automatic updates of firmware can help to ensure an improved secure networking environment. For instance, relying on a customer to update his or her satellite device might result in the customer's satellite device lacking a security upgrade. In this and similar scenarios, the satellite device might be vulnerable to a malware attack because the satellite device lacks an antidote to the malware that was made available in a later version of the firmware.

In an embodiment and any of the satellite devices 716A-N, network access device 702, network-accessible server system 704, and computer program 710 may be configured to determine whether any satellite device (e.g., second satellite device 716B) is configured with the most up-to-date or required firmware. It should be appreciated that while one satellite (e.g., second satellite device 716B) may be used as an example in the following discussion, it is for illustrative purposes and is not meant to be limiting. In the example, the satellite boot certificate or other metadata associated with the satellite boot certificate can indicate an initial firmware version, which can be used by any of the above-cited entities to determine whether the firmware presently loaded on second satellite device 716B matches the presently required firmware. For instance, a user could have purchased the satellite device months before installing the satellite device. It therefore, could be possible that a newer version of the firmware became available during the time after the purchase and before installation. Thus, in this example, at installation, the firmware associated with the satellite boot certificate is not up-to-date.

In an embodiment, network-accessible server system 704 pushes the required firmware intended for second satellite device 716B by using network access device 702. In an embodiment, the firmware that gets pushed onto any satellite device is digitally signed so that any configured entity can verify whether the firmware is valid and not malware imposing as legitimate firmware. In another embodiment, network access device 702 may have the required firmware itself and may push such required firmware intended for second satellite device 716B itself. The embodiments disclosed herein ensure that a secure configuration is deployed to second satellite device 716B, once second satellite device 716B has been brought online.

An embodiment for monitoring firmware updates includes a satellite device being configured to identify its current firmware status and to send such status to the network access device or to the network-accessible server system. In an embodiment, the network access device determines whether the firmware status is up-to-date and, when not, either pushes a firmware update in its storage to the satellite device or transmits a request to the network-accessible server system for the most up-to-date firmware for the satellite device. In an embodiment, the network-accessible server system determines whether the firmware status is up-to-date and, when not, pushes a firmware update in its storage to the satellite device.

In an embodiment for monitoring firmware updates in a tree network architecture of two or more satellite devices, a first satellite can ping the other satellites in the tree network for the purposes of receiving their respective firmware versions. The first satellite is configured to compare its firmware version with received firmware versions. If the first satellite device concludes that their respective firmware versions match, then the first satellite device is configured to conclude that no firmware update is required. The first satellite device may send an update notification intended for the network-accessible server system. The first satellite device may be further configured to conclude that its firmware version is different from any of the other received firmware versions. The first satellite device, upon detecting that its firmware version does not match all other firmware versions, may be configured to report to the network-accessible server system that there is a discrepancy in firmware versions. In an embodiment, the network-accessible server system pushes the latest firmware version to the first satellite device. In another embodiment, the first satellite device, upon detecting that its firmware version does not match all other firmware versions, may be configured to report to the network access device that there is a discrepancy in firmware versions. In an embodiment, the network access device pushes the latest firmware version to the first satellite device. In an embodiment, upon receiving a notification from the first satellite device that there is a discrepancy of firmware versions on the network, the network access device may transmit a firmware update request to the network-accessible server system for firmware updates for the first satellite device and, optionally, for the other satellite devices on the network.

In an embodiment for monitoring firmware updates, each of the satellite devices on the network can, upon request or periodically, transmit their respective firmware statuses to the network access device. The network access device is configured to decide whether any firmware upgrades are required for any of the satellite devices on the network. In an embodiment, when an upgrade is required, the network access device can make a request for such upgrade to the network-accessible server system for the upgrade. In an embodiment, the network-accessible server system can automatically push a firmware upgrade for any satellite device to the network access device. Network access device can be configured to, upon receipt of the automatically pushed firmware upgrade from the network-accessible server system, automatically decide which satellite needs the upgrade and automatically push such upgrade to the satellite device.

It should be appreciated that network-accessible server system 704 may push other configurations intended for second satellite device 716B via network access device 702. For example, such configurations enable second satellite device 716B to be fully operative on network access device 702. As another example, using electronic device 720 and computer program 722, a user can configure second satellite device 716B by setting suitable parameters through a user interface on computer program 710 that connects with network-accessible server system 704. Then, network-accessible server system 704 pushes the entered configurations intended for second satellite device 716B via network access device 702.

Upon obtaining Internet connectivity, second satellite device 716B initiates self-registration in network-accessible server system 704. Such an arrangement allows network access device 702 and any number of satellites to be connected to network-accessible server system 704, as well as the computer program 722, regardless of whether electronic device 720 resides within the network associated with network access device 702. When electronic device 720 resides outside of such network, changes requested through computer program 710 can be carried out by network-accessible server system 704. In some embodiments, each of a plurality of satellites within the network is connected to network access device 702 in accordance with a hub-and-spoke approach (i.e., each satellite is connected directly to network access device 702). In other embodiments, the satellites within the network are permitted to form a tree network architecture. Thus, each satellite need not necessarily be directly connected to the network access device. For example, as shown in FIG. 7, second satellite device 716B can be connected to first satellite device 740, which is connected to network access device 702.

By installing a separate digital certificate on each of network access device 702, computer program 722, and satellite device(s) (e.g., first satellite device 740 and second satellite device 716B), network-accessible server system 704 can ensure that these objects are tied together. Consequently, for an unauthorized entity to gain access to the network, the unauthorized entity would need to acquire the digital certificate in addition to the credentials (e.g., username and password) used to log into computer program 722.

As described above, a specialized PKI accessible to the network-accessible server system (e.g., network-accessible server system 704) can be configured to facilitate the distribution of digital certificates, each of which may include a public encryption key, to the network access device(s) (e.g., network access device 702), mobile application(s) (e.g., computer program 722), and satellite(s) (e.g., a first satellite device and second satellite device) associated with a network. The network-accessible server system may communicate with the PKI via application programming interfaces (APIs), bulk data interfaces, etc. Generally, the network-accessible server system will request a separate certificate for each mobile application and satellite. For example, if the network access device is set up to be connected to a single mobile application and four satellites distributed throughout an environment (e.g., a home), then the network-accessible server system may request five certificates and distribute a unique certificate to each of the mobile application and satellites.

Intermediate digital certificates may be distributed by one of the network-accessible server system 704 or the PKI module 734. Intermediate digital certificates may be generated for firmware verification. The intermediate digital certificates may include information indicative of identifying the network-accessible server system 704. The network-accessible server system 704 may digitally sign the firmware by providing information identifying the network-accessible server system 704 on the intermediate digital certificate. The network access device 702 may receive the intermediate digital certificate and determine that firmware has been digitally signed and is verified.

One benefit of the tree architecture described herein is that security risk can be lessened even when the network access device and the satellite(s) are produced by different entities. For example, an individual may have a router manufactured by Comcast® and an Orbi® Wi-Fi System manufactured by NETGEAR® deployed within her home. In such instances, the individual can log into a mobile application executing on her mobile phone, claim the network access device, and configure each satellite. In some embodiments, the network access device is configured to communicate with the satellite(s). For instance, in such embodiments, traffic received at either level (e.g., by the network access device or the satellite devices) can be examined for threats. In other embodiments, the satellite(s) operate independent from the network access device. In such embodiments, only traffic received by the satellite(s) may be examined for threats.

According to embodiments herein, each time a new electronic device (e.g., a new satellite device or a new mobile device) comes onto the network, the satellite device or the network access device to which the new electronic device connects can transmit a notification to the associated mobile application. The notification may prompt the user to specify whether network access should be permitted. While this type of multifactor approval process requires an express indication of approval from a network administrator (e.g., the user responsible for deploying the network access device and/or satellite(s)), it can significantly lessen the security risk of unauthorized access. Administrator authorization may be required even if the party attempting to access the network has acquired the necessary credentials (e.g., the password).

In some embodiments and as described above, each network access device and/or satellite within a network environment is configured to automatically update its firmware. Thus, in accordance with embodiments herein, when these objects are properly connected (e.g., via a tree architecture), the firmware across all of the devices will be consistent. Such action ensures that a hacker cannot gain unauthorized access via a security flaw in an older firmware version that has not yet been manually updated by the network administrator.

Figure 8:
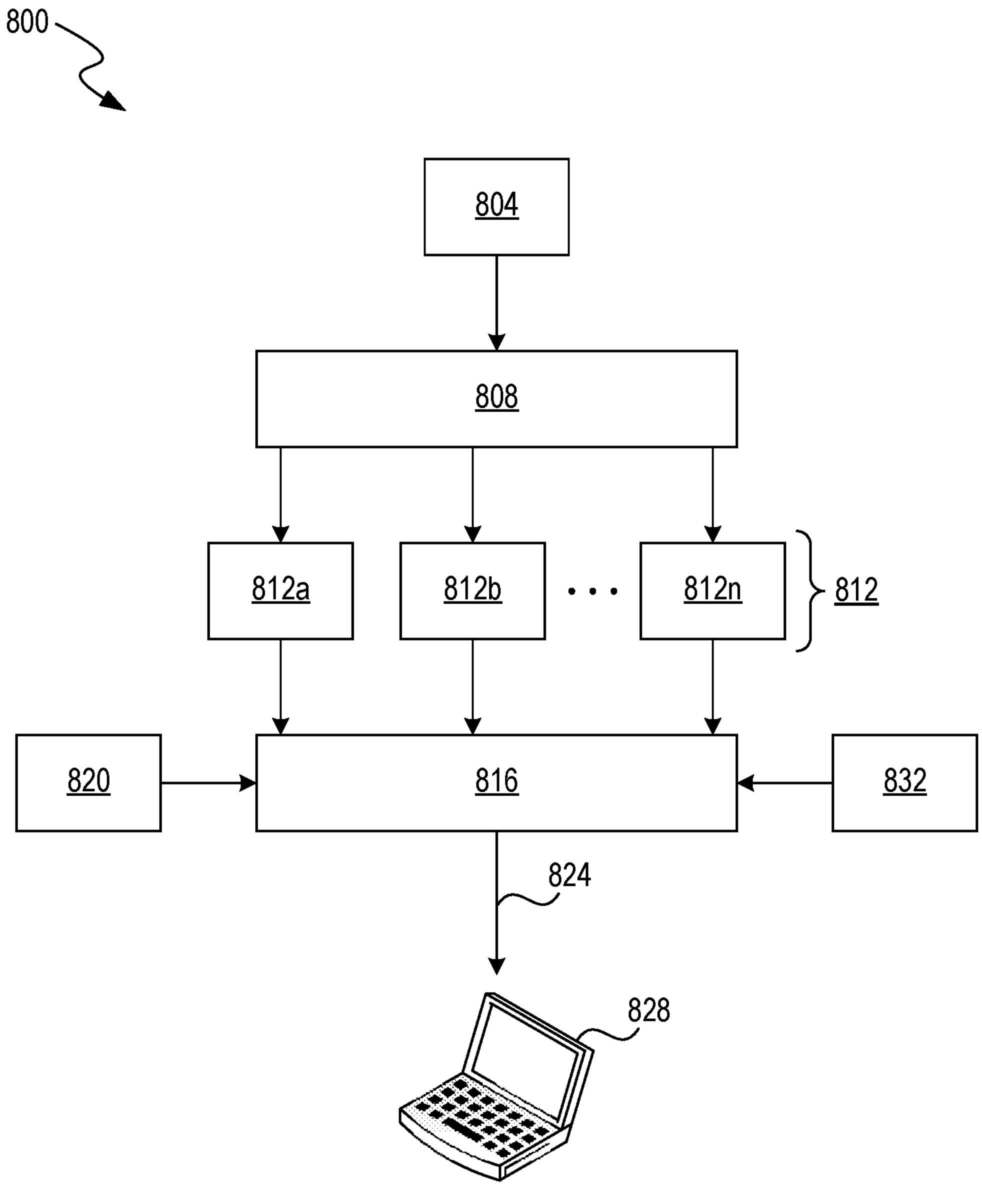
FIG. 8 is a block diagram illustrating an example machine learning (ML) system, in accordance with one or more embodiments.

FIG. 8 is a block diagram illustrating an example ML system 800, in accordance with one or more embodiments. The ML system 800 is implemented using components of the example computer system 900 illustrated and described in more detail with reference to FIG. 9. Likewise, embodiments of the ML system 800 can include different and/or additional components or be connected in different ways. The ML system 800 is sometimes referred to as an ML module. The ML system 800 can be implemented within any of the devices illustrated and described in more detail with reference to FIG. 7.

The ML system 800 includes a feature extraction module 808 implemented using components of the example computer system 900 illustrated and described in more detail with reference to FIG. 9. In some embodiments, the feature extraction module 808 extracts a feature vector 812 from input data 804. The feature vector 812 includes features 812*a*, 812*b*, . . . , 812*n*. The feature extraction module 808 reduces the redundancy in the input data 804, e.g., repetitive data values, to transform the input data 804 into the reduced set of features 812, e.g., features 812*a*, 812*b*, . . . , 812*n*. The feature vector 812 contains the relevant information from the input data 804, such that events or data value thresholds of interest can be identified by the ML model 816 by using this reduced representation. In some example embodiments, the following dimensionality reduction techniques are used by the feature extraction module 808: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 816 performs deep learning (also known as deep structured learning or hierarchical learning) directly on the input data 804 to learn data representations, as opposed to using task-specific algorithms. In deep learning, no explicit feature extraction is performed; the features 812 are implicitly extracted by the ML system 800. For example, the ML model 816 can use a cascade of multiple layers of nonlinear processing units for implicit feature extraction and transformation. Each successive layer uses the output from the previous layer as input. The ML model 816 can thus learn in supervised (e.g., classification) and/or unsupervised (e.g., pattern analysis) modes. The ML model 816 can learn multiple levels of representations that correspond to different levels of abstraction, wherein the different levels form a hierarchy of concepts. In this manner, the ML model 816 can be configured to differentiate features of interest from background features.

In alternative example embodiments, the ML model 816, e.g., in the form of a CNN generates the output 824, without the need for feature extraction, directly from the input data 804. The output 824 is provided to the computer device 828. Each of the computer devices 828 can be a server, laptop, desktop, computer, tablet, smartphone, smart speaker, etc., implemented using components of the example computer system 900 illustrated and described in more detail with reference to FIG. 9. In some embodiments, the steps performed by the ML system 800 are stored in memory on the computer device 828 for execution. In other embodiments, the output 824 is displayed on the computer device 828.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 816 can be a CNN that includes both convolutional layers and max pooling layers. The architecture of the ML model 816 can be "fully convolutional," which means that variable sized sensor data vectors can be fed into it. For all convolutional layers, the ML model 816 can specify a kernel size, a stride of the convolution, and an amount of zero padding applied to the input of that layer. For the pooling layers, the model 816 can specify the kernel size and stride of the pooling.

In some embodiments, the ML system 800 trains the ML model 816, based on the training data 820, to correlate the feature vector 812 to expected outputs in the training data 820. As part of the training of the ML model 816, the ML system 800 forms a training set of features and training labels by identifying a positive training set of features that have been determined to have a desired property in question, and, in some embodiments, forms a negative training set of features that lack the property in question.

The ML system 800 applies ML techniques to train the ML model 816, that when applied to the feature vector 812, outputs indications of whether the feature vector 812 has an associated desired property or properties, such as a probability that the feature vector 812 has a particular Boolean property, or an estimated value of a scalar property. The ML system 800 can further apply dimensionality reduction (e.g., via linear discriminant analysis (LDA), PCA, or the like) to reduce the amount of data in the feature vector 812 to a smaller, more representative set of data.

The ML system 800 can use supervised ML to train the ML model 816, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 832 is formed of additional features, other than those in the training data 820, which have already been determined to have or to lack the property in question. The ML system 800 applies the trained ML model 816 to the features of the validation set 832 to quantify the accuracy of the ML model 816. Common metrics applied in accuracy measurement include: Precision and Recall, where Precision refers to a number of results the ML model 416 correctly predicted out of the total it predicted, and Recall is a number of results the ML model 416 correctly predicted out of the total number of features that had the desired property in question. In some embodiments, the ML system 800 iteratively re-trains the ML model 816 until the occurrence of a stopping condition, such as the accuracy measurement indication that the ML model 816 is sufficiently accurate, or a number of training rounds having taken place. The validation set 832 can be generated based on analysis to be performed.

Figure 9:
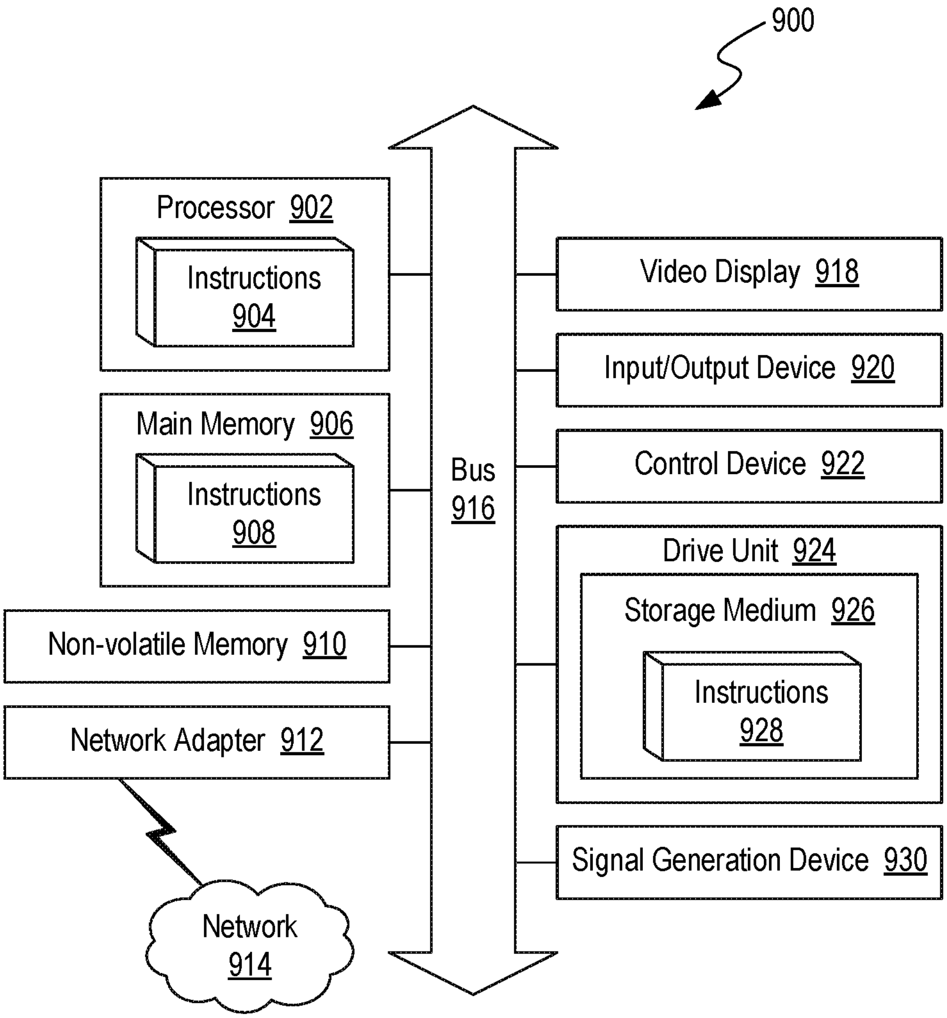
FIG. 9 is a block diagram illustrating an example computer system, in accordance with one or more embodiments.

FIG. 9 is a block diagram illustrating an example computer system 900, in accordance with one or more embodiments. In some embodiments, components of the example computer system 900 are used to implement the ML system 800 illustrated and described in more detail with reference to FIG. 8. At least some operations described herein can be implemented on the computer system 900.

The computer system 900 can include one or more central processing units ("processors") 902, main memory 906, non-volatile memory 910, network adapters 912 (e.g., network interface), video displays 918, input/output devices 920, control devices 922 (e.g., keyboard and pointing devices), drive units 924 including a storage medium 926, and a signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 900 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the computer system 900.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 904, 908, 928) set at various times in various memory and storage devices in a computer device. When read and executed by the one or more processors 902, the instruction(s) cause the computer system 900 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 912 enables the computer system 900 to mediate data in a network 914 with an entity that is external to the computer system 900 through any communication protocol supported by the computer system 900 and the external entity. The network adapter 912 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 912 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. An antenna, comprising:
- a first metallic portion comprising:
  - a first trough-shaped shell; and
  - a first trough-shaped conduit configured to be:
    - disposed along a first shell surface; and
    - connected to the first shell at a first shell end, the first conduit comprising a first pair of indented sidewalls;
- a second metallic portion configured to be aligned with and spaced from the first portion at the first shell end, the second portion comprising:
  - a second trough-shaped shell; and
  - a second trough-shaped conduit configured to be:
    - disposed along a second shell surface; and
    - connected to the second shell at a second shell end, the second conduit comprising a second pair of indented sidewalls;
- a plastic insert configured to attach to the first pair of indented sidewalls to couple the first portion to the second portion, the insert comprising a segment defining an eye; and
- a cable configured to pass through the eye and configured to communicate signals, the cable comprising:
  - an electrically insulative shielding configured to be grounded to the first conduit, and
  - an electrically conductive core encapsulated by the shielding and configured to be connected to the second conduit.

2. The antenna from claim 1, wherein each of the first and second shells comprises two opposing crenellated sides having beveled edges configured to grip on to a molded support structure wrapped around the center of the antenna, the molded support structure configured to assist in holding together the first metallic portion and the second metallic portion.

3. The antenna from claim 1, wherein the first conduit extends over the first shell into a space between the first and second metallic portions at the first and second shell ends, and
- wherein the second conduit extends over the second shell into the space.

4. The antenna from claim 1, wherein the first pair of indented sidewalls of the first conduit protrudes beyond a first pair of opposing sides of the first shell, and
- wherein the second pair of indented sidewalls of the second conduit protrudes beyond a second pair of opposing sides of the second shell.

5. The antenna from claim 1, wherein the first and second pair of indented sidewalls each have a sidewall that is angled at the first and second shell ends.

6. The antenna from claim 1, wherein the plastic insert has grooves configured to interlock with the first pair of indented sidewalls.

7. The antenna from claim 1, wherein each of the first and second pair of indented sidewalls comprises a sidewall having a hooked portion.

8. The antenna from claim 7, wherein the cable is configured to be grounded to the first conduit at a first hooked portion of one of the first pair of indented sidewalls, and
- wherein the cable is configured to electrically connect to the second conduit at a second hooked portion of one of the second pair of indented sidewalls.

9. The antenna of claim 1, wherein the antenna is a multi-band dipole antenna.

10. The antenna of claim 1, wherein at least one of the first metallic portion or the second first metallic portion comprises at least one of copper, annealed copper, stainless steel, gold, silver, aluminum, calcium, tungsten, zinc, nickel, iron, an alloy, barium carbonate, silicon dioxide, yttrium oxide, a ceramic material, or carbon nanotube hybrids.

11. The antenna of claim 1, wherein the cable has a length in a range from 5 mm to 500 mm.

12. The antenna of claim 1, wherein the insert comprises at least one of acrylonitrile butadiene styrene (ABS), polycarbonate, acrylic-polyvinyl chloride thermoplastic, recycled thermoplastics, Thermoplastic Polyolefin, amorphous blends of polyphenylene ether resin and polystyrene, amorphous thermoplastic polyetherimide, Polytetrafluoroethylene, high-performance polyaryletherketones, fluoropolymers, or electromagnetically transparent plastics with dielectric properties.

13. The antenna of claim 1, wherein the insert has a length in a range from 20 mm to 35 mm.

* * * * *